June 26, 1934.                A. BENARIO                1,964,308
                               GEAR LOCK
                            Filed May 27, 1933
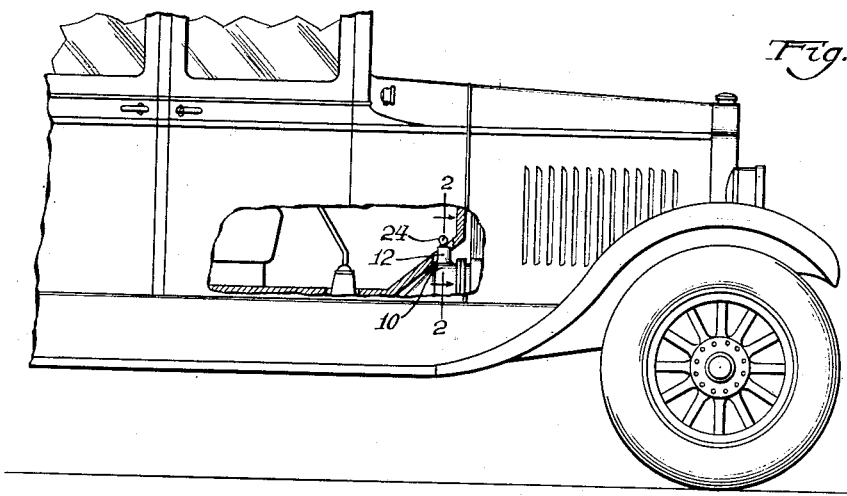
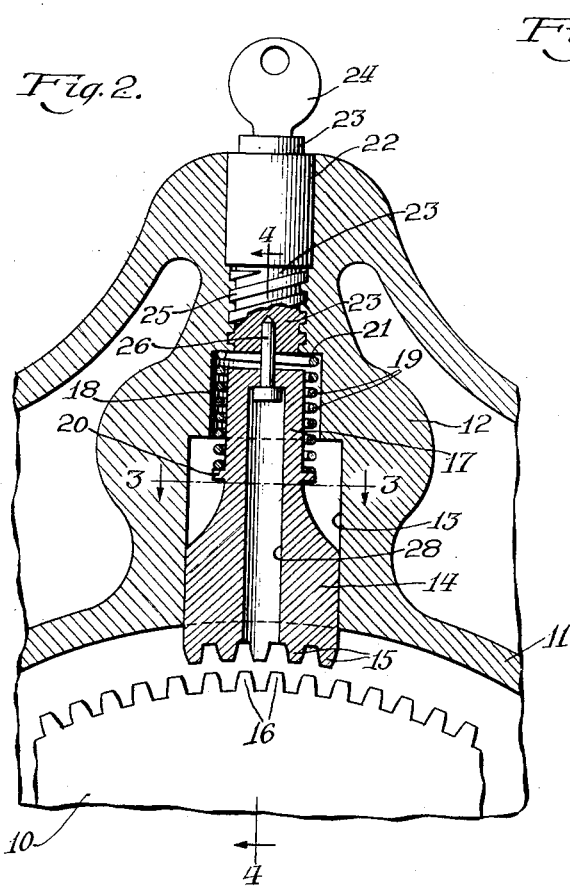
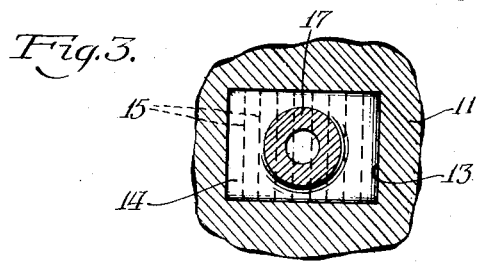
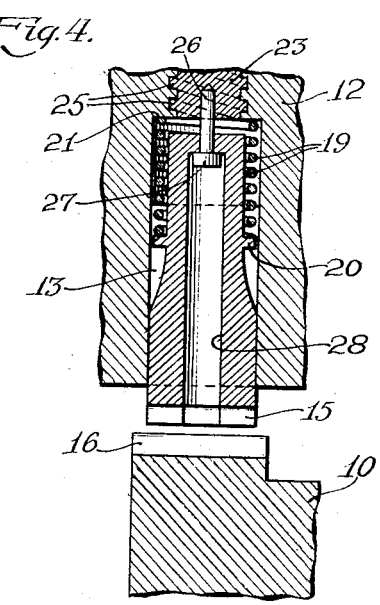
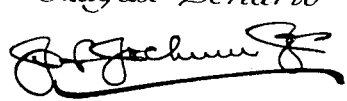
INVENTOR
August Benario
BY
ATTORNEY.

Patented June 26, 1934

1,964,308

UNITED STATES PATENT OFFICE 1,964,308

GEAR LOCK

August Benario, Chicago, Ill., assignor to E. K. Avery, Chicago, Ill.

Application May 27, 1933, Serial No. 673,218

2 Claims. (Cl. 70—90)

This invention relates to improvements in locks for locking gears against rotation, and is particularly adapted, though not necessarily limited in its use, for automobile gears, and one of the objects of the invention is to provide an improved lock of this character which is housed within the gear casing, and which embodies a member adapted, when the lock is actuated in one direction, to be moved into a position that portions of the member will be positioned between adjacent teeth of the gear to prevent the latter from rotating until such portions of the locking member have been withdrawn by operating the lock in the opposite direction.

A further object is to provide an improved lock of this character in which the gear locking member will be moved into an active position by means of a resilient element and will be moved into an inactive position and against the stress of the said resilient element, by a positive actuating means, such as a key or the like.

A further object is to provide an improved lock of this character embodying a reciprocable element movable into and out of contact with a portion of the teeth of the gear, and a rotatable member for actuating the reciprocable element, means being provided for maintaining the reciprocable element against rotation with the rotatable element, resilient means being also provided which operates upon the gear engaging element whereby the latter will yield sufficiently, in the event the locking element contacts with the end faces of the gear teeth, and thereby prevent injury to the gear teeth, and at the same time operate to insure a locking engagement of the element with the gear teeth.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which Figure 1 is a view partly in elevation, partly broken away and partly in section, of a portion of an automobile, having a lock constructed in accordance with the principles of this invention applied thereto.

Figure 2 is an enlarged detail sectional view taken on line 2—2, Figure 1.

Figure 3 is a sectional view taken on line 3—3, Figure 2.

Figure 4 is a detail sectional view taken on line 4—4, Figure 2.

Referring more particularly to the drawing the numeral 10 designates generally a gear, here shown as the gear of an automobile transmission, which is housed within a casing 11, the gear 10 being the element which is to be locked against rotation.

The casing 11 is provided with a portion 12 of increased or reinforced thickness having a recess or chamber 13 therein, which opens into the gear chamber and in close proximity to the periphery of the gear.

The chamber or recess 13 may be of any desired configuration, but is preferably angular in cross section so that a locking member 14 which is adapted to be reciprocated therein, will be held against axial rotation.

This member 14 is provided with a face of substantial length in a direction about the periphery of the gear 10 and the face is provided with spaced gear teeth 15 adapted, when the member 14 is moved into locking position, to engage between adjacent teeth 16 of the gear 10.

The member 14 may be of any desired size and is provided with a neck or reduced portion 17 which projects into a recess 18 within the portion 12 of the casing, the recess or chamber 18 being of an internal diameter which is sufficiently greater than the external diameter of the neck 17 of the member 14 to provide a space therebetween for the reception of a coiled spring 19. The spring encompasses the neck 17, and one end thereof rests against a shoulder 20 on the member 14. The other end of the spring rests against a shoulder 21 formed at the end of the recess or chamber 18.

The normal tendency of the spring 19 is to move the locking member 14 in a direction to cause the teeth 15 to enter the spaces between the teeth 16 of the gear 10, and when the locking member 14 is moved into an inactive position, the spring 19 will be placed under compression.

Any suitable means may be provided for moving the locking member 14 into an inactive position, such for instance as a lock designated generally by the reference numeral 22, which is also housed within the reinforced or enlarged portion 12 of the casing 11 of the gear to be protected thereby.

The lock may be of any desired construction. Suffice it to say that the lock contains a tumbler or barrel 23 adapted to be operated by a key 24. The tumbler or barrel 23 projects for a considerable distance beyond the casing of the lock and is provided with a screw thread 25 of a considerable pitch, which engages threads in the wall of a recess in the portion 12 of the gear casing, so that when the barrel 23 is rotated by the key it will also be given a quick forward or backward movement in directions towards or away from the periphery of the gear 10, according to the direction of rotation of the key 24. The barrel 23 is located above the neck or reduced portion 17 of the locking member 14, so that their axes will be substantially in alinement and the barrel 23 is connected with the locking member 14 in any desired or suitable manner such as by means of a connecting member 26 having a head 27, which is seated within a recess 28 in the member 14 and projects beyond the end of the neck 17 to enter the barrel 23, and is secured in any suitable manner. The adjacent ends of the member 14 and the barrel 23 are spaced from each other for an appreciable distance so as to permit of an independent movement of the locking member 14 with respect to the barrel 23 of the lock in directions lengthwise of their axes.

In operation and when the parts are in the position shown in Figure 2, the locking member 14 will be in an inactive position with respect to the gear 10 and will be held in this position against the stress of the spring 19 by means of the barrel 23 of the lock, and the threads 25. The spring 19 is under compression.

When it is desired to lock the gear, the operator inserts the key 24 and rotates the same several times, causing the barrel 23 to be moved forwardly with a quick movement by reason of the threads 25. As the barrel 23 moves forwardly, the stress of the spring 19 upon the locking member 14 will advance the latter to cause the teeth 15 thereof to enter the spaces between the teeth 16 of the gear 10, and when in this position, the key 24 may be removed from the lock in a manner well known in the lock art.

When the locking member 14 is in active position with respect to the gear 10, it will be manifest that the gear 10 will be prevented from rotating in either direction, and by reason of the extended area of the teeth 15 in a direction about the circumference of the gear an extended locking surface will be provided.

By reason of the connection 26—27 and the shape of the locking member 14 with respect to the recess 13, it will be manifest that the barrel 23 of the lock may be rotated to advance or retract the locking member 14, while at the same time the locking member will be held against rotation, thereby converting a rotary motion of the barrel into a rectilinear motion of the locking member 14.

When it is desired to move the locking member 14 into an inactive position to release the gear, the key 24 is inserted in the lock and the barrel 23 retracted by rotating the key in the opposite direction. The quick acting threads 25 will retract the barrel 23 and will also retract the locking member 14 against the stress of the spring 19.

By reason of the independent movement of the locking member 14 with respect to the barrel 23 and of the spring or resilient member 19, it will be manifest that in the event the locking member 14 is advanced to lock the gear, and should the end faces of the teeth 15 contact with the end faces of the teeth 16 of the gear, the member 14 will yield with respect to the barrel 23, but the operation of the barrel and key will not be interfered with. The spring 19 will then act, in the event of a slight rotation of the gear 10, to force the teeth 15 of the locking member 14 into the spaces between the teeth 16 of the gear 10, when the latter spaces are in position to receive the teeth 15.

With this invention it will be manifest that a positively safe lock will be provided, and inasmuch as all of the operating parts of the lock are housed within the wall of the gear casing, it will be impossible to tamper with the lock, and also impossible to unlock the gear without the use of the proper key 24 in the lock.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. In combination with a casing having a gear chamber, a gear housed within the chamber and fixed against lateral movement, a chamber in the casing wall communicating with the gear chamber, a slidable locking element within the second recited chamber, the end of said element engageable with the teeth of the gear, a key controlled element rotatably supported by the casing for forward and backward longitudinal movement, such elements being separate from each other and arranged in alinement, a spring between said elements tending normally to separate them, and means forming a loose connection between said elements for permitting a definite sliding movement of the gear engaging element with respect to the other element and whereby the gear engaging element will be adapted to be maintained against axial rotation while the other of said elements may be freely rotated.

2. In combination with a casing having a gear chamber, a gear housed within the chamber and fixed against lateral movement, a chamber in the casing wall communicating with the gear chamber, a slidable locking element within the second recited chamber, the end of said element engageable with the teeth of the gear, a key controlled element rotatably supported by the casing for forward and backward longitudinal movement, such elements being separate from each other and arranged in alinement, a spring between said elements tending normally to separate them, and means forming a loose connection between said elements for permitting a definite sliding movement of the gear engaging element with respect to the other element and whereby the gear engaging element will be adapted to be maintained against axial rotation while the other of said elements may be freely rotated, the said means comprising a headed member swiveled to one of the elements and anchored to the other of such elements.

AUGUST BENARIO.